(No Model.)

J. BÖHLING.
ELECTRIC TIME BALL.

No. 348,949. Patented Sept. 14, 1886.

Witnesses
Charles Kaspar
John Hansen

Inventor
John Böhling

UNITED STATES PATENT OFFICE.

JOHN BÖHLING, OF WASHINGTON, DISTRICT OF COLUMBIA.

ELECTRIC TIME-BALL.

SPECIFICATION forming part of Letters Patent No. 349,949, dated September 14, 1886.

Application filed November 12, 1885. Serial No. 182,560. (No model.)

*To all whom it may concern:*

Be it known that I, JOHN BÖHLING, a subject of the Emperor of Germany, residing at Washington, District of Columbia, have invented certain new and useful Improvements in Electric Time-Balls; and I do hereby declare that the following is a full, clear, and exact description of the invention, which will enable others skilled in the art to which it appertains to make and use the same.

My invention relates to improvements in electric time-balls in which a ball suspended on a vertical rod is caused to be dropped coincidently with the time-ball of an observatory, thus indicating exact noon or other standard fixed time corresponding with that of the observatory ball; and the objects of my improvements are, first, to provide a portable time-ball to be used in the show-cases of jewelers to indicate noon; second, to furnish an article of attraction in said show-cases which will serve as an advertisement. To carry out the first object I cause the ball to be dropped at the precise time of the fall of the observatory ball. To carry out the second object I usually employ a glass rod upon which the ball is suspended, and cause the ball to drop by a slight rotary movement of the rod, the ball remaining stationary by virtue of its inertia and detaching itself from the rod. The slight movement of the rod is imperceptible, and as glass is a well-known insulator and is transparent no apparent cause for the falling of the ball will be seen. This will render the operation puzzling, and therefore attractive, and I regard this an important feature of my invention. I accomplish these objects by mechanism illustrated in the accompanying drawings, in which—

Figure 4:
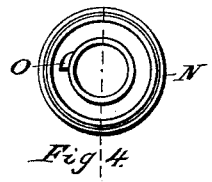
Figure 6:
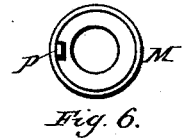
Figure 5:
Figure 7:
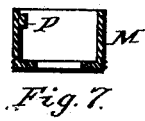
Figure 8:
Figure 2:
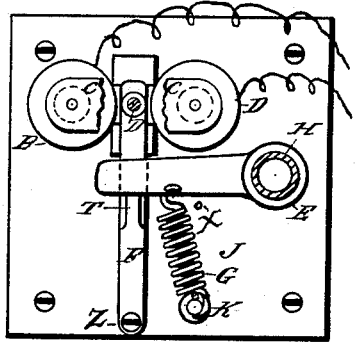
Figure 3:
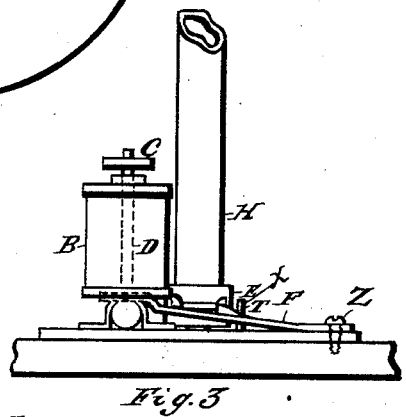
Figure 1:
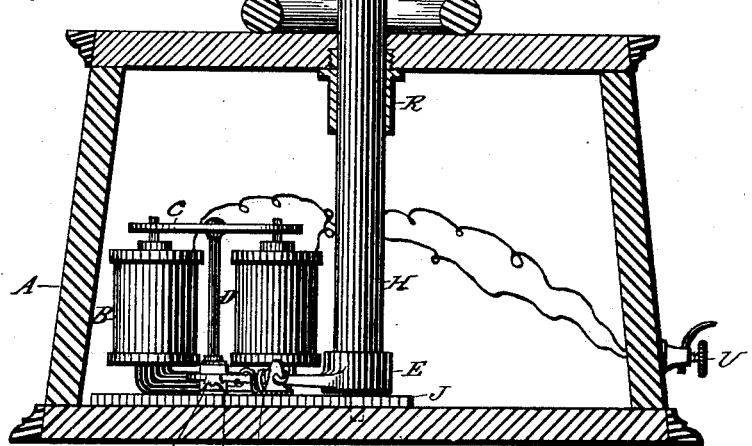

Figure 1 is a vertical section through the case, disclosing an elevation of the mechanism. Fig. 2 is a plan of the same with parts broken away and in section. Fig. 3 is a side elevation with parts broken away. Figs. 4 and 5 are details of the cap placed upon the top of the rod, showing the detaching-stop. Figs. 6 and 7 are details showing the mechanism secured to the top of the ball and which interlocks with the detaching apparatus of the cap. Fig. 8 is an enlarged section of the stops.

In the drawings like letters of reference indicate the same parts in all the views.

A is the case concealing the operating mechanism.

H is the vertical rod, made of glass or other material, upon which the time-ball L is suspended.

M is a cylindrical piece attached to the ball, and is provided with a stop-piece, P.

N is a cap firmly attached to the top of the rod H, and is provided with the stop-piece O. This stop-piece O has a downward incline on top and an abutment, as shown best in Fig. 8.

I is a cushion upon which the ball drops when released.

B is an electro-magnet, with wires leading to binding-screws V. This electro-magnet is provided with an armature, C. To the armature C is attached a rod, D.

Attached to the base of the rod H is a lever, E. The foot of the rod H swivels upon the base-plate J, and on the top of the case there is a steadying bearing, R, for the rod to move in. The lever E is pulled back by means of a spring, G, secured to it and to a binding-post, K.

F is a spring provided with a detent or catch, T, upon which the arm E catches and is held, the spring G being then in tension. The rod D presses lightly upon the spring F during the time when there is no current passing through the electro-magnet.

X is a stop-pin placed a short distance from the lever E, and serves to limit the movement of the arm E, and consequently the rotation of the rod H, when that movement takes place at the passage of the current from the main observatory.

The object of the abutment on the stop O is to limit the adjustment of the ball on suspending it at the top of the rod, and the inclined upper surface of the stop is to prevent the ball from detaching itself on account of any unforeseen jarring.

The several parts of the mechanism being in position, as shown in the drawings, the operation is as follows: Suitable connections are made by means of the binding-screws V with the main wires leading from the observatory, so as to form part of the circuit. This may be done in various ways, the simplest one being to allow the main current from the observatory leading to the time-regulator of a standard clock to pass the binding-screws V, as part of the circuit. At noon, when the observatory ball drops, a current passes through the main wires and adjusts the hands of the standard clock to noon, and on its passage passes through the wires secured to the binding-screws V and through the electro-magnet B, which, becoming magnetic, causes the armature C to descend, carrying with it the rod D. The rod D presses strongly upon the spring F, depressing it to such an extent that the arm E will be released from the catch T. As soon as the arm E is released from the catch, the spring G, which is as yet in a state of tension, will cause a sharp rotary movement of the arm E, and also of the rod H, which is firmly attached to the arm. The ball, by virtue of its inertia, and by resting freely upon the top of the stop O, will not participate in this rotary motion; but the stop O, being firmly connected with the rod H, will move with it and slip from under the stop P connected with the ball, thus allowing the ball to become free and descend. In practice I have found that a very slight sharp movement of the arm E and rod H is sufficient to cause the ball to descend, and this movement, on account of its quickness and small extent, is invisible to the eye. After the ball has fallen, it can be raised by hand and rested in place upon the top of the rod. The rod is turned from the outside until the arm E again catches over the catch T of the spring F, and the apparatus is thus set to have the operation repeated. The whole case is then sealed, and for better concealment of the operation the binding-screws may be placed at the bottom of the case, where the wires will not be seen.

Instead of the arm E and spring G, I may use a spiral spring connected to the bottom of the rod H, and while this is in tension and the ball suspended have the spring released by the passage of the current either directly to a releasing-catch of soft iron, which is depressed by the current, or by means of the electro-magnet.

Without limiting myself to the precise construction shown, what I claim as new, and desire to cover by Letters Patent, is—

1. In an electric time-ball, the combination of a rod with a ball suspended thereon, with means, substantially as described, for rotating the rod and releasing the ball.

2. The combination of a rod with a ball, said rod having a cap with a stop-rest, and said ball being provided with an attachment and stop-rest with upper inclined surface and abutment, substantially as and for the purpose specified.

3. With an electric time-ball, the combination of a rod provided with a lever, a spring operating said lever, and a spring with a stop-catch for restraining the lever and keeping the operating-spring in a state of tension, substantially as described.

4. The combination of a rod and lever, an operating-spring and stop-catch, an armature provided with an arm for freeing the restraining-spring, and an electro-magnet for moving the armature, substantially as described.

5. In an electric time-ball, the combination of a rod capable of being rotated by mechanism, substantially as described, with a ball suspended thereupon, as set forth.

6. In an electric time-ball, the combination of a ball, D, rod H, arm E, stop-pin X, spring G, spring F, with catch T, electro-magnet B, with armature C and arm D, substantially as described.

JOHN BÖHLING.

Witnesses:
CHARLES KASPAR,
JOHN HANSEN.